United States Patent [19]
Jansson

[11] Patent Number: 5,198,924
[45] Date of Patent: Mar. 30, 1993

[54] OPTICAL COMPONENT COUPLING AND COMPOSITION THEREFOR

[75] Inventor: David Jansson, Los Altos, Calif.
[73] Assignee: General Signal, Stamford, Conn.
[21] Appl. No.: 802,414
[22] Filed: Dec. 4, 1991
[51] Int. Cl.$^5$ .................. C03C 27/00; G02B 6/34; G02B 13/14
[52] U.S. Cl. .................. 359/350; 359/355; 385/37; 523/168
[58] Field of Search .............. 359/340, 355, 894, 896; 385/65, 37; 523/168

[56] References Cited
U.S. PATENT DOCUMENTS
4,634,216 1/1987 Calevo et al. .................. 385/65
4,964,705 10/1990 Markle.

Primary Examiner—Martin Lerner
Attorney, Agent, or Firm—Oblon, Spivak, McClelland, Maier & Neustadt

[57] ABSTRACT

An optical coupling fluid which is transmissive to light, is a polymerized (cured) gel prepared from a mixture of two silicon components, one a silicon oil and one a silicon gel. The miscible substances can be combined to provide a composition suitable for preparation of a thin film between the optical components which then polymerizes to form the gel without danger of leakage. The transmissive characteristics are excellent, and coupling material does not become opaque to short wavelengths under use conditions.

10 Claims, 1 Drawing Sheet

OPTICAL COMPONENT COUPLING AND COMPOSITION THEREFOR

BACKGROUND OF THE INVENTION

1. Field of the Invention

This invention pertains to a composition which is suitable as a material to coupling optical components such as lenses without substantial loss of transmission. The material is particularly suited to formation of optical component couplings for mercury lamps (i-line) and deep ultraviolet optical projection and illumination systems and systems employing ultraviolet light sources such as mercury lamps. The invention pertains to the coupled optical components, as well as the composition itself.

2. Background of the Prior Art

Conventional optical projection systems frequently comprise a mirror plus a refractive assembly. The refractive array frequently will include two components, that must be optically coupled, to transmit light. Resolution of the image projected is of course, limited, by the wavelength of the light transmitted. Shorter and shorter wavelengths are sought, to improve resolution. Examples of one technology in need of such improved resolution are projection systems used for the integrated circuit fabrication and manufacture technology.

Conventional projection and illumination systems require the optical coupling together of disperate materials, such as $SiO_2$ and $CaF_2$, as well as LiF, to obtain desired performance. Separate components must be optically coupled, that is, they must be joined in a relationship such that the transmitted light can pass therebetween. Typically, in conventional apparatus, the optical components can be coupled with a conventional cement. However, all known optical lens cements are either opaque to deep ultraviolet transmission, e.g., 240 nm, and similar wavelengths, or become opaque, or turn black, upon repeated exposure to ultraviolet transmission.

It should be further noted that the lenses cannot simply be physically pressed together, as perfect matching of surfaces never occurs, giving undesirable variable transmission between the surfaces. It should be further noted that frequently the lenses have differing coefficients of thermal expansion. In a combination of a $SiO_2$ lens, and $CaF_2$ lens, the coefficient of expansion of the calcium fluoride lens may be 20 times that of the silicon dioxide. Obviously, if these two materials were rigidly cemented together, a relatively small temperature change could cause one of them to shatter or at least induce birefringence that could impair image quality. Accordingly, a soft optical agent that allows differential expansion coupling between dissimilar materials yet provides a uniform low reflectivity lightpath is highly desirable.

Certain types of lens coupling media are known. Typically they will include a silicon oil. A typical silicon oil is available from Dow Corning Corporation, and marketed under the name DOW CORNING 200. This oil is a low viscosity fluid, insoluble in water, having a specific gravity at 25° C. of about 0.98. Although substantially transmissive to deep ultraviolet and i-line (365 nm) light, the silicon oil's low viscosity makes it difficult to handle. It tends to smear and spread over the lens, the coupling interface, and everywhere else, and presents serious challenges to containment. Those products on the market incorporating such a silicon oil as the coupling composition for two optical lenses have been plagued by containment problems. Of course, any loss of optical coupling, disturbing the optical transmission, is intolerable. As the layer of coupling material is extremely thin, e.g., 0.02 mm or so, there is not substantial room for error.

Accordingly, it remains an object of those skilled in the art to obtain a composition suitable for coupling optical lenses, which has the transmissive characteristics necessary for deep ultraviolet and i-line wavelengths, and related high transmission at those wavelengths, is sufficiently fluid so as to provide for thin layer coatings between the lenses, and does not produce a large difference in index of refraction, such that too much of the image light is lost in reflection.

An additional very desirable property of the optical coupling medium is the ease with which it can be confined to the desired interface. An immobile gel is much preferred over a high surface energy oil which tends to leak, creep and migrate to places where it can seriously interfere with performance.

SUMMARY OF THE INVENTION

The above-disclosed objects, and other objects and advantages more clearly discussed below, are achieved by coupling optical components with a physical mixture of a silicon oil, and a silicon gel. This combination, on exposure to ambient conditions, sets up into a soft, compliable polymerized gel. Before setting up, the mixture of the oil and gel materials provides a relatively low viscosity liquid such that thin coatings, from about 0.10 to about 0.005 mm thickness can be formed on the optical component surfaces. After set-up or polymerization, the resultant gel will remain fixed in the assembly, without fear of leakage or creep or loss of transmission or the introduction of excessive stress.

By varying the proportions of oil and gel components, a gel with a wide range of hardness can be obtained. A relatively hard gel might be used to couple similar materials where relative motion is not desired. A relatively soft gel might be used between materials having dissimilar coefficients of expansion and required to endure large temperature excursions.

An exemplary example is provided by combining a silicon gel marketed by Dow Corning under the mark DOW CORNING Q3-6575 dielectric gel, and a silicon oil, DOW CORNING 200 fluid. The gel consists of two liquid components which when mixed together in the recommended proportions will cure or set-up into a hard, rigid gel. By adding some of the silicon oil to the gel compound mixture, it is possible to obtain a wide range of gel hardnesses. These materials are completely miscible, and are substantially transparent to short wavelengths.

By varying the relative proportions of oil and gel components, it is also possible to change the resultant index of refraction of the gel and thereby better match the index of the components being coupled. Further control of the refractive index may be obtained by using different oils and gel component compositions. When using DOW CORNING 200 silicon oil and DOW CORNING Q3-6575 silicon gel, a suitable mixture of approximately 1:1 on a weight basis, produces a very soft and compliable gel but with sufficient rigidity that it is easily contained.

DETAILED DESCRIPTION OF THE INVENTION

Figure 1:
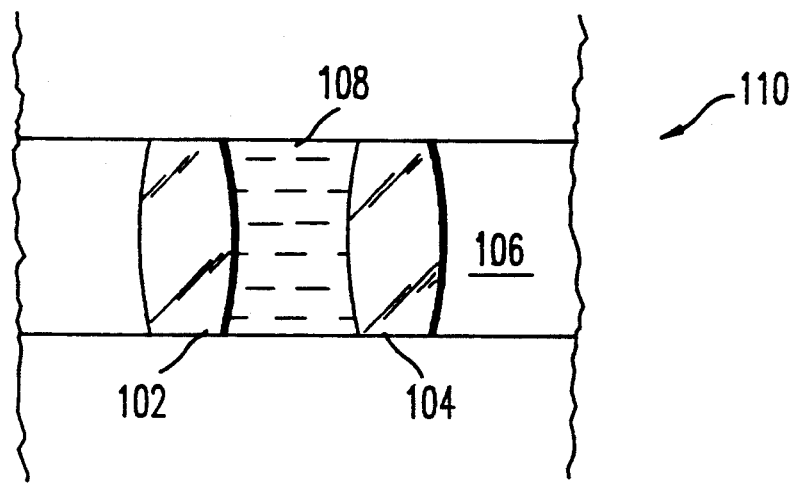
FIG. 1 is schematic illustration of the coupling of two optical lenses using the coupling fluid of this invention.

As noted above, silicon fluids, in particular, silicon oils, although transparent to ultraviolet transmission, have such a low viscosity that they present the problems of containment in actual couplings. In contrast, silicon gels, which, if not modified, may also be transparent to short wavelength transmission (400 nm to 240 nm), are entirely too hard after setting up, introducing excessive stress into the optical components after curing.

Accordingly, applicant has discovered that a combination of a silicon oil and a silicon gel, such as DOW CORNING 200 and DOW CORNING Q3-6575, can be combined to give a desirable hardness.

A further advantage of the combination of silicon oil and silicon gel is that, in general, these compounds are not hazardous to humans. As noted, it is necessary that they be 100% miscible. In the case of the oil and gel noted above, as with most silicon oil and gels, they have a specific gravity of 0.98 and 0.97, respectively, and both have a vapor pressure of less than 5 mm at 25° C. The volatiles, by weight, are less than 5%, and neither shows appreciable evaporation. As silicon materials, they are less than 0.1% soluble in water, and both have similar indices of refraction, giving, as an overall index of refraction for the polymerized, modified gel, 1.461 at a wavelength of 248 nm.

DOW CORNING 200 and DOW CORNING Q3-6575 were combined in a 1:1 ratio. Test results using a quartz cuvette show an initial transmission at 248 nm of 50%, for a 10 millimeter path of the polymerized gel. As noted above, in use, the thickness of the compound is likely to be less than 0.02 millimeters, confirming adequate transmission at wavelengths below 400 nm.

Equally important, under repeated cycling exposure to pulses of 1.5 joules/cm$^2$, at 248 nm, typical use conditions, the mixture does not deteriorate appreciably, or separate. Thus, in contrast to conventional optical cements, the claimed optical cement is not opaque to short wavelengths and does not become opaque over time.

The mechanical properties of the mixture provide for movement, due to thermal expansion of deep ultraviolet optical materials such as LiF, SiO$_2$, and CaF$_2$, due to the gel-like characteristic of the mixture. In one preferred embodiment, an ULTRAN 30 ® lens material made by Schott is coupled with an LLF-6 lens material, available from both Schott and O'Hara. In contrast to prior art using oils, the mixture is more easily contained and sealed, avoiding potential containment problems.

It should be noted that virtually any silicon oil and silicon gel, provided they are transmissive at wavelengths below 400 nm, can be suitably used in this invention. Most such oils and gels will be, in combination, completely miscible, and chemically compatible. Actual ratios of gel to oil will vary with the application envisioned, and can be experimentally determined. The gel need only be rendered sufficiently soft for the components to be coupled. In addition to lenses, other optical components, such as a light pipe and prism, may be coupled by this invention. As little as 1% oil may be sufficient. The maximum oil content is limited by the gel selection. If too much oil is added, the gel becomes a liquid. As a general rule, a minimum of 35% gel will be used.

Figure 2:
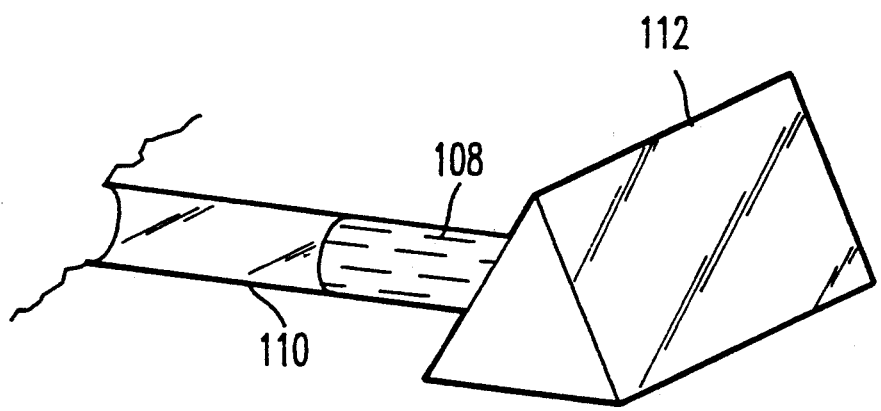
FIG. 2 is a schematic illustration of the coupling of a light pipe and prism using the coupling fluid of this invention.

Actual couplings are illustrated in FIGS. 1 and 2. In FIG. 1, two optical lenses 102 and 104 are coupled in housing 100, provided with a recess 106 to receive the lenses. Coupling fluid 108 is provided between lenses 102 and 104. Referring to FIG. 2, a light pipe 110 and prism 112 may be similarly coupled with the inventive coupling fluid 108. As indicated above, the optical elements 110 and 112 will be maintained in a housing (not illustrated) which can be used to seal the coupling fluid of the invention.

The invention of this application has been described, above, by reference to generic description and specific embodiment. The specific embodiments are not limited, except where so indicated. In particular, oils and gels alternative to those described above, will occur to those of ordinary skill in the art as suitable alternatives, without the exercise of inventive faculty. Accordingly, the invention, save for the recitations in the claims set forth below, embrace such variation.

What is claimed is:

1. An optical coupling composition for coupling two optical components comprising a polymerized gel comprised of:
   (a) a silicon oil transmissive to light and (b) a silicon gel transmissive to light, said oil and gel being present in amounts sufficient to provide a gel sufficiently soft to allow thermal expansion of said optical components without damage thereto.

2. The composition of claim 1, wherein said oil and gel are present in a weight ratio of 1:99–65:35.

3. The composition of claim 1, wherein said oil and gel are present in a weight ratio of 1:1.

4. The composition of claim 1, wherein said oil and gel are transmissive to visible light and ultraviolet light.

5. The composition of claim 1, wherein said oil and gel are transmissive to ultraviolet light.

6. An optical coupling between two optical components, comprising first and second optical components and a coupling material therebetween, said coupling material comprising a polymerized gel comprised of (a) a silicon oil transmissive to light and (b) a silicon gel transmissive to light, said oil and gel being present in amounts sufficient to provide a gel sufficiently soft to allow thermal expansion of said optical components without damage thereto.

7. The optical coupling of claim 6, wherein said coupling material is present as a film between said lenses having a thickness of 0.1–0.005 mm.

8. The optical coupling of claim 6, wherein said components have different coefficients of thermal expansion.

9. The optical coupling of claim 6, wherein said components comprise optical lenses.

10. The optical coupling of claim 6, wherein one of said optical components is a light pipe, and the other is a prism.

* * * * *